United States Patent [19]

DiGiovanniantonio

[11] 3,938,763

[45] Feb. 17, 1976

[54] SPACE SHUTTLE ORBITER BARRICADE

[75] Inventor: Perry R. DiGiovanniantonio, Philadelphia, Pa.

[73] Assignee: The United States of America as represented by the Secretary of the Navy, Washington, D.C.

[22] Filed: May 23, 1974

[21] Appl. No.: 472,559

[52] U.S. Cl. .............................. 244/110 C; 428/122
[51] Int. Cl.² .......................................... B64F 1/02
[58] Field of Search ....... 244/110 R, 110 C; 161/86, 161/88, 50, 149, 227; 117/7, 26, 28, 68; 428/122, 192, 193

[56] References Cited
UNITED STATES PATENTS

| | | | |
|---|---|---|---|
| 2,341,019 | 2/1944 | Cook | 161/88 X |
| 3,069,118 | 1/1962 | Bernard | 244/110 R |
| 3,215,375 | 11/1965 | Radovitz | 244/110 C |
| 3,468,500 | 9/1969 | Carlsson | 244/110 C |
| 3,513,231 | 5/1970 | Bair et al. | 244/110 R X |
| 3,559,697 | 2/1971 | Whalen | 244/110 R |
| 3,622,107 | 11/1971 | Bernard | 244/110 C |
| 3,810,595 | 5/1974 | Doolittle | 244/110 C |

Primary Examiner—Trygve M. Blix
Assistant Examiner—Barry L. Kelmachter
Attorney, Agent, or Firm—R. S. Sciascia; Henry Hansen

[57] ABSTRACT

A barricade installation for arresting the motion of a winged space vehicle comprising four rectangular loops of heavy duty nylon rope commonly attached at each corner to a pair of stanchions by tensioning pendants, and at opposite vertical sides to a pair of arresting engines. A plurality of vertical, nylon engaging straps are positioned between top and bottom horizontal ropes at finite intervals along the length thereof in step-wise fashion. Upon engagement of the vertical straps by the vehicle, the rectangular loops break away from the stanchions and move in the direction of forward motion of the vehicle, and loading on the vehicle frame and wing assemblies is equalized during arrestment as the vertical straps are free to move relative to the horizontal ropes.

2 Claims, 6 Drawing Figures

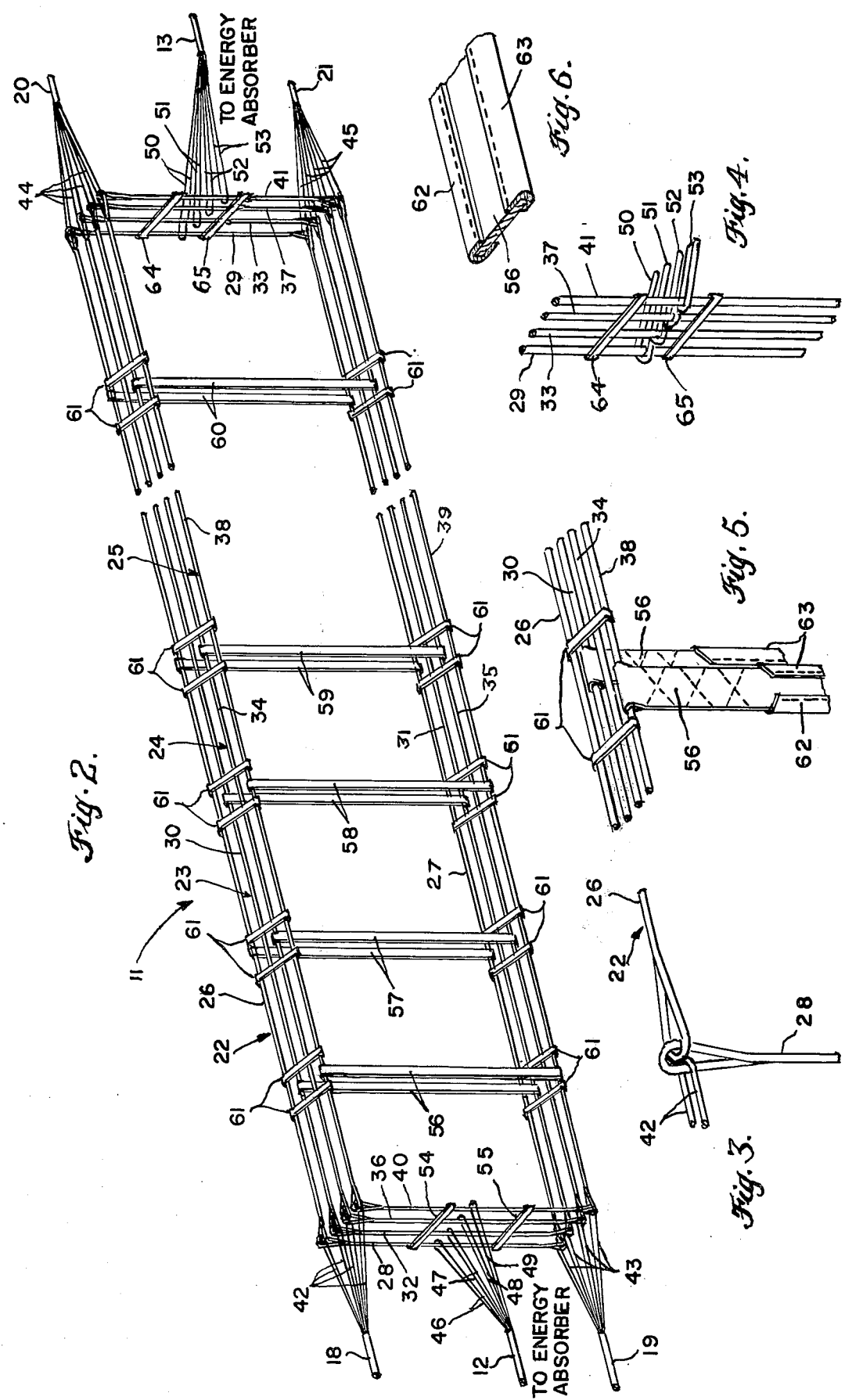

SPACE SHUTTLE ORBITER BARRICADE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of aeronautics and more particularly to retarding and restraining devices utilizing cable or net supports.

Barricades or nets are normally used as emergency devices for retarding the motion of a vehicle in a limited amount of space. Present emergency barricades for arresting the motion of a landing aircraft generally consist of expendable webbing assemblies which are stretched across a runway in the path of the vehicle and include some form of nylon straps or ropes interconnected in various configurations and attached to an energy absorbing device. The aforesaid webbing generally comprises the barricade vertical members which engage the aircraft wings to equalize loading and absorb the force of the vehicle's forward motion. Present operational aircraft for which arresting barricades are designed range to maximum weights of 50,000 pounds, lengths of 78 feet, canopy heights of 12½ feet, and wing spans of 78 feet (Navy A3 Skywarrior). In the past, normal loads imposed by current operational aircraft have cut, shredded and torn the vertical straps and loading members of the barricade due to the violent impact of aircraft engagement. Several possible deleterious effects of such strap failure during an arrestment include uneven loading on the vehicle causing violent motion of the vehicle and uneven deceleration with possible harm to the vehicle's occupants. These problems become more acute as the size and weight of the vehicle are increased. Presently, a space shuttle orbiter contemplated by NASA for travel between earth and an orbiting space station is of a size and weight magnitude considerably greater than any present operational aircraft capable of being arrested by current barricades. For example, the presently contemplated orbiter will weigh as much as 220,000 pounds, with an overall length of 125 feet, a canopy height of 30 feet, and a wing span of 96 feet. Problems of cutting, tearing and shredding are therefore greatly magnified, necessitating greater strength and resistance to cutting, shredding and abrasion. Mere increase of the size of current barricade components to meet the added strength requirements is not feasible because of the greatly increased bulk that would be produced. The added bulk would materially increase handling and rigging problems associated with such a barricade. In addition, the present problems of cutting, tearing and shredding of barricade members would not be alleviated. An additional problem is also encountered when connecting hardware on present barricades impact against the vehicle surface during engagement, causing considerable amounts of damage.

SUMMARY OF THE INVENTION

Accordingly, it is a general purpose and object of the present invention to provide an improved, reliable, simplified, higher strength barricade for arresting the forward motion of a vehicle such as the NASA space shuttle orbiter. It is another object to provide a barricade having nylon engaging straps with polyurethane-coated nylon edging surrounding each strap for greater resistance to abrasion and cutting of strap edges and higher strength. It is yet a further object to provide a simplified, relatively inexpensive vehicle barricade in which all connecting hardware has been eliminated.

These and other objects are accomplished according to the present invention by a barricade comprising rope means having a pair of substantially horizontal flexible members formed to be supported at their respective ends in the path of the vehicle, web means having a plurality of substantially vertical flexible members operatively connected at their ends between the horizontal members and edging means attached to the edges of the vertical flexible members.

BRIEF DESCRIPTION OF THE DRAWINGS

FIG. 2 is a perspective view of the components of a barricade constructed according to the invention shown in a raised, operative position prior to engagement by a vehicle;

FIG. 3 is a perspective view of a typical corner connection of a horizontal and vertical loading rope and a single tensioning pendant of the barricade of FIG. 2;

FIG. 4 is a perspective view showing a typical connection of vertical support ropes to extension loops formed to be connected to an energy absorber of the barricade of FIG. 2;

FIG. 5 is a perspective view of a typical connection of a pair of vertical engaging straps to horizontal loading ropes of the barricade of FIG. 2; and FIG. 6 is a perspective view showing details of the edging material surrounding a vertical engaging strap of the barricade of FIG. 2.

DESCRIPTION OF THE PREFERRED EMBODIMENT

Figure 1:
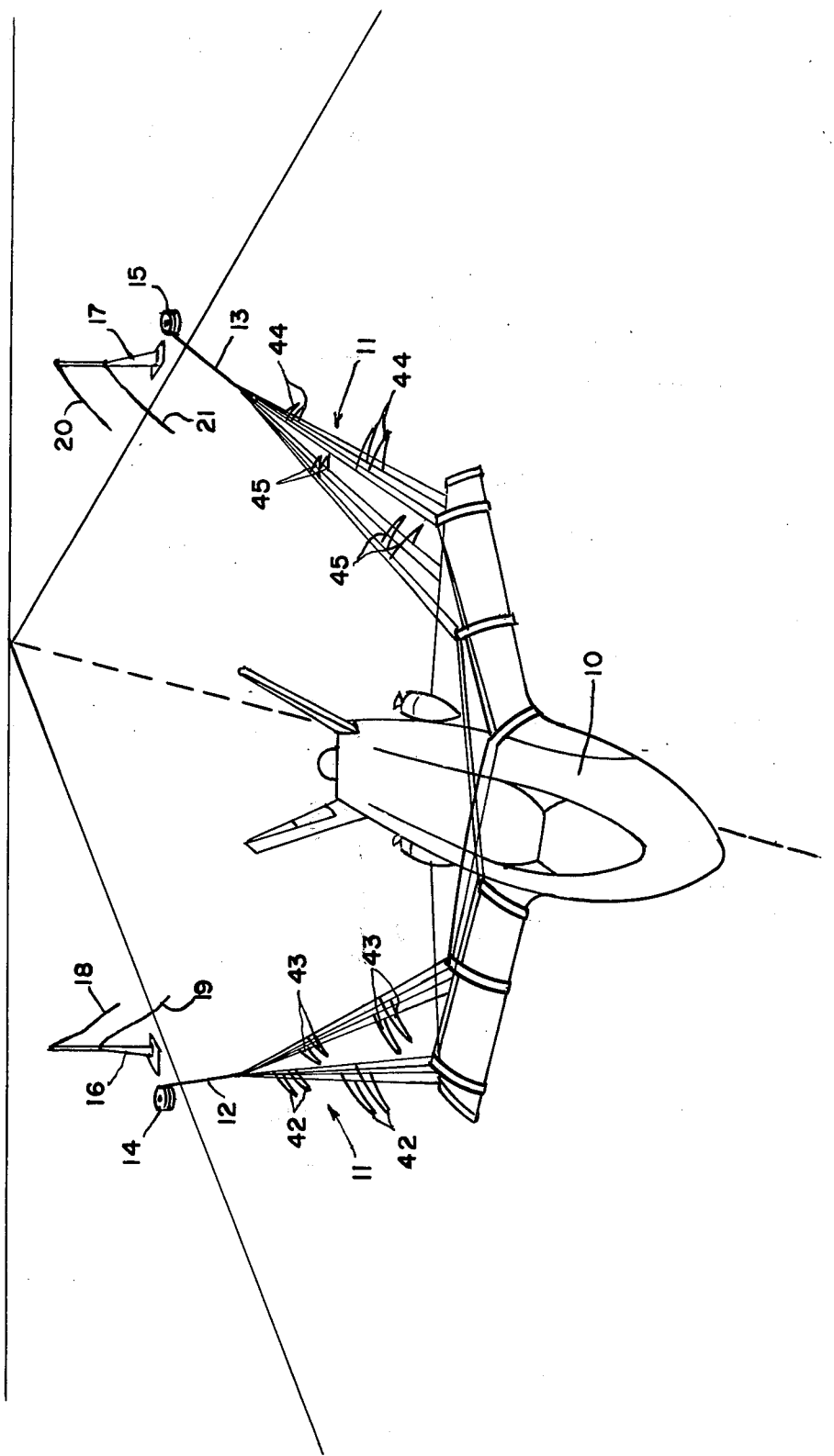
FIG. 1 represents a perspective view showing engagement of the barricade by a space shuttle orbiter.

Referring to FIG. 1, a winged, space shuttle orbiter 10 is shown engaging a barricade 11 connected by cables 12 and 13, or any other appropriate connection means, to energy absorbing devices 14 and 15, located on opposite sides of a runway. A pair of stanchions 16 and 17 are shown adjacent energy absorbing devices 14 and 15 on the sides of the runway, with pairs of respective breakway straps 18 and 19, and 20 and 21 loosely dangling therefrom. The breakway straps are initially connected to the respective four corners of barricade 11 when in a fully erected position prior to engagement by orbiter 10, as shown more clearly in FIG. 2 and more fully described hereinafter. It should be noted that only the wings of orbiter 10 engage barricade 11, which is designed to move a predetermined distance in the direction of vehicle motion before completely stopping orbiter 10.

Referring now to FIG. 2, barricade 11 is shown in a fully erected position prior to engagement by a vehicle. In a preferred embodiment, barricade 11 includes four rectangular loops 22, 23, 24 and 25, of a high strength, flexible material, such as nylon rope, but it should be understood that any other flexible material having suitable strength may be substituted. A preferred rope used in the present preferred embodiment has a 3¼ inch diameter with a tensile strength of 308,000 pounds. It should be noted here that a total of thirty 1½ inch wide standard nylon straps would be necessary to duplicate the tensile strength of one 3¼ inch diameter nylon rope. Such an arrangement would not be feasible due to the greatly increased bulk causing handling difficulties. Each rope used in loops 22, 23, 24 and 25 is coated with a thin layer of polyurethane coating for increased resistance to abrasion, cutting, and shredding. Each loop consists of opposing pairs of horizontal and vertical ropes, each rope having an eye at both ends formed by looping the ends back and securing them to the body of the rope by a one piece splice. Each rope is joined to another rope by interlinking the respective eyes, as is more clearly shown in FIG. 3. For example, loop 22 includes horizontal ropes 26 and 27 interconnected between vertical ropes 28 and 29. Similarly, loop 23 includes horizontal ropes 30 and 31 interconnected between vertical ropes 32 and 33; loop 24 includes horizontal ropes 34 and 35 interconnected between vertical ropes 36 and 37; and loop 25 includes horizontal ropes 38 and 39 interconnected between vertical ropes 40 and 41. Loops 22–25 are shown broken across top horizontal ropes 26, 30, 34 and 38, and bottom horizontal ropes 27, 31, 35 and 39, indicating that barricade 11 is considerably wider than as shown in FIG. 2. Each of loops 22–25 is connected at a corner to one of respective breakaway straps 18–21, by individual groups of cables or ropes. For example, each of loops 22–25 are connected at a first corner to strap 18 by cables 42, at a second corner to strap 19 by cables 43, at a third corner to strap 20 by cables 44, and at a fourth corner to strap 21 by cables 45. A typical corner connection is shown in FIG. 3, in which horizontal rope 26 of loop 22 is looped through the eye of vertical rope 28, and the ends of both ropes are secured to their respective interior portions by a one piece splice for increased structural integrity. One of cables 42 is shown looped through the eye of vertical rope 28 forming a complete corner connection which is typical of all remaining corner connections on barricade 11. Cables 42–45, which are connected respectively to breakaway straps 18–21, are used to tension barricade 11 prior to engagement, keeping it fully erect in the path of the oncoming vehicle. Cables 42–45 are designed to breakaway from straps 18–21, respectively, at some predetermined, relatively nominal force. Vertical ropes 28, 32, 36 and 40, are connected at one side of barricade 11 to cable 12 by extension loops 46, 47, 48 and 49, respectively, which are looped around each individual vertical rope and connected in common at their respective ends to cable 12. Loops 46–49 which may be constructed of nylon rope or any other suitable flexible material, transmit the energy due to vehicle engagement of loops 22–25 to energy absorber 14 via cable 12. Vertical ropes 29, 33, 37 and 41 are similarly connected at the other side of barricade 11 to cable 13 by extension loops 50, 51, 52 and 53, which are similarly looped therearound and connected in common at their respective ends to cable 13. Extension loops 50–53 similarly transmit the forces due to vehicle engagement from vertical ropes 29, 33, 37 and 41 to energy absorber 15 via cable 13. Extension loops 46–49 are initially free to slide vertically between clips 54 and 55, which also keep vertical ropes 28, 32, 36 and 40 stationary relative to each other prior to vehicle engagement. Similarly, extension loops 50–53 are initially free to slide between clips 64 and 65, which similarly keep vertical ropes 29, 33, 37 and 41 stationary relative to each other. Clips 54, 55, 64 and 65 are preferably constructed of a non-metallic material, such as hard rubber or plastic, and break away from the ropes upon vehicle engagement. The actual connections of loops 50–53 around vertical ropes 29, 33, 37 and 41 are shown more clearly in the enlarged view of FIG. 4.

Pairs of engaging straps 56, 57, 58, 59 and 60 are respectively attached between top horizontal ropes 26, 30, 34 and 38 and bottom horizontal ropes 27, 31, 35 and 39 in a step-wise fashion. The engaging straps are preferably constructed of a high strength flexible material, such as two ply nylon webbing, approximately 11 inches wide, and are spaced at equal intervals of approximately 10 feet across the length of the top and bottom horizontal ropes. Engaging straps 56–60 are initially free to slide horizontally within defined limits between clips 61 spaced approximately 12 inches apart around the top and bottom horizontal ropes on either side of each pair of engaging straps. Upon vehicle engagement, clips 61, which are preferably constructed of hard rubber or plastic, break away from the ropes, and engaging straps 56–60 are free to slide horizontally across the entire length of barricade 11 to equalize loading on the vehicle. Each engaging strap of a respective pair, such as 56, encircles alternate ones of top horizontal ropes 26, 30, 34 and 38, and bottom horizontal ropes 27, 31, 35 and 39. For example, as more clearly shown in FIG. 5, one of straps 56 is looped around top horizontal rope 38 and bottom horizontal rope 39, while the other of straps 56 is similarly looped around top horizontal rope 30 and bottom horizontal rope 31. One of adjacent pair of straps 57 is similarly looped around top horizontal rope 34 and bottom horizontal rope 35, while the other one of straps 57 is looped around top horizontal rope 26 and bottom horizontal rope 27. This alternating pattern continues across the length of barricade 11 and defines what is meant by connection in "step-wise" fashion. Each of straps 56 is tightly looped around respective top horizontal ropes 30 and 38 and sewn in some appropriate manner to form a high-strength connection. In order to prevent cutting, tearing and shredding of straps 56–60 upon engagement of barricade 11 by orbiter 10, U-shaped polyurethane-coated nylon edging material 62 and 63 is attached, such as by sewing, around the edges of straps 56 along the length thereof. Enlarged FIG. 6 shows the method of attachment of edging materials 62 and 63 to elongated, flat strap 56 in greater detail, and is typical for all of engaging straps 56–60. Edging materials 62 and 63 encompass the edges and are attached adjacent thereto, extending approximately three-fourths inches from the edges of strap 56. Engaging straps 56–60 may or may not be covered with polyurethane-coating for greater abrasion resistance, but in the present preferred embodiment they are preferably not coated due to the requirement that they remain flexible during engagement by orbiter 10. Edging materials 62 and 63 are preferably nylon strap approximately 1¾ inches wide, which is bent around each respective edge and permanently attached, such as by sewing, leaving a large portion in the middle of strap 56 uncovered. Addition of material 62 and 63 to the edges only of the vertical engaging straps has been found to practically eliminate cutting, tearing and shredding of these straps. It can be seen from the foregoing description that no hardware is used in the assembly of barricade 11, thus avoiding impact of such hardware against the wings and fuselage of orbiter 10 with resultant damage.

Having thus described the present invention, some of the many advantages should now be readily apparent. The novel preferred embodiment barricade affords a simplified, higher strength, more reliable and efficient barricade for vehicle arrestment. The polyurethane-coated nylon edging used on all straps practically eliminates all cutting, tearing, shredding and abrasion of the engaging straps during an arrestment. Joining of all loops and engaging straps by splicing or sewing, rather than attachment by hardware reduces overall barricade cost and number of parts necessary, while increasing reliability and eliminating damage to the orbiter during arrestment.

Obviously, many modifications and variations of the present invention are possible in light of the above teaching. It is therefore to be understood that within the scope of the appended claims the invention may be practiced otherwise than as specifically described.

What is claimed:

1. An arresting barrier for arresting aircraft having a fuselage and wings of predetermined size, comprising:
   a plurality of barrier elements;
   each of said barrier elements including vertically spaced horizontally disposed upper and lower rope members and horizontally spaced vertically disposed left and right rope members, wherein each end of each rope member terminates in an integral loop and the loops of said upper and lower rope members are interlinked with corresponding loops of said left and right rope members;
   each of said barrier elements further including a plurality of horizontally spaced vertically disposed engaging straps each strap having two end portions respectively encircling said upper and lower vertically spaced horizontally disposed rope members to thereby slidably attach said strap to said upper and lower rope members;
   each of said engaging straps having an edge protector attached to and covering each edge thereof, said edge protector having a U-shaped transverse cross section;
   said barrier elements juxtaposed in substantially parallel planes, corresponding straps of adjacent barrier elements juxtaposed with respect to each other, the adjacent straps of each barrier element being horizontally offset relative to each other to thereby define a plurality of openings, each opening having a horizontal dimension sufficient to permit passage of a portion of the fuselage of an aircraft to be arrested while preventing passage of the wings of said aircraft;
   means slidably attached to corresponding vertically disposed rope members of each said barrier element for connecting each said vertically disposed rope member to a corresponding energy absorber, wherein said rope members each comprise a polyurethane coated nylon rope having a predetermined diameter and said vertically disposed engaging straps each comprise multi-ply nylon webbing and each said edge protector comprises nylon webbing having a polyurethane coating thereon; and
   means attached to the vertically disposed rope members of each barrier element for connecting each said vertically disposed rope member to a corresponding stanchion.

2. An arresting barrier according to claim 1 wherein said plurality of barrier elements is four.

* * * * *